United States Patent
Wang et al.

(10) Patent No.: US 8,270,420 B2
(45) Date of Patent: Sep. 18, 2012

(54) ISCSI TO FCOE GATEWAY

(75) Inventors: Songbo Wang, Beijing (CN); Boby Joseph, Shrewsbury, MA (US); James S. Hiscock, Rockport, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 312 days.

(21) Appl. No.: 12/638,954

(22) Filed: Dec. 15, 2009

(65) Prior Publication Data

US 2011/0142062 A1    Jun. 16, 2011

(51) Int. Cl.
*H04L 12/28*      (2006.01)
*H04L 12/56*      (2006.01)
(52) U.S. Cl. ........................ 370/401; 370/285
(58) Field of Classification Search .................. 370/401, 370/467
See application file for complete search history.

(56) References Cited

U.S. PATENT DOCUMENTS

| | | | | |
|---|---|---|---|---|
| 5,856,974 A * | 1/1999 | Gervais et al. | ................ | 370/392 |
| 7,404,000 B2 * | 7/2008 | Lolayekar et al. | ............ | 709/230 |
| 8,036,243 B2 * | 10/2011 | Georgiou et al. | ............. | 370/467 |
| 2009/0168788 A1 * | 7/2009 | Den et al. | ...................... | 370/401 |

* cited by examiner

*Primary Examiner* — Ayaz Sheikh
*Assistant Examiner* — Blanche Wong (57) ABSTRACT

Transparent communication between iSCSI and FCoE end nodes is provided by a gateway device having iSCSI and FCoE network interfaces. The gateway allows end nodes of one protocol to communicate with end nodes of another protocol as if they were communicating with end nodes of the same protocol. The gateway accomplishes this by creating "ghost" end nodes for each protocol. For example, the gateway creates ghost iSCSI nodes corresponding to physical FCoE nodes, and ghost FCoE nodes corresponding to physical iSCSI nodes. A ghost end node of a particular protocol is able to communicate with native end nodes of that protocol as if it were a native end node, because the gateway translates packets sent from end nodes in their native protocol into the other protocol for receipt by corresponding ghost nodes, and vice versa.

42 Claims, 11 Drawing Sheets

ISCSI TO FCOE GATEWAY

FIELD

In general, embodiments of the present invention are directed to techniques for providing reliable data network communication services using both iSCSI and FCoE technologies.

BACKGROUND

Large enterprise networks often provide remote branch networks access to data center storage. The needs of a data center network, however, cannot be satisfied by traditional Local Area Networks (LANs) and Wide Area Networks (WANs). For example, data center networks require lossless, low-latency communication, which traditional LANs and WANs cannot provide. In contrast, the Fibre Channel over Ethernet (FCoE) protocol can provide the lossless, low-latency communication required by data center networks. As a result, enterprises often supply remote access to FCoE data centers, thereby creating virtualized storage environments with reduced total cost of ownership.

FCoE, however, is restricted to Layer 2 Ethernet environments. As a result, FCoE cannot be used to provide WAN access to data center storage. In contrast, the Internet Small computer System Interface (iSCSI) protocol uses the TCP/IP protocol as a transport mechanism, and therefore is capable of providing WAN connectivity. As a result, iSCSI can be used to provide WAN connectivity to data center storage. To provide iSCSI access to a data center network which uses FCoE, however, would require using either two network interfaces or a dual stack (one for iSCSI and one for FCoE). Such solutions are expensive and tedious to implement.

What is needed, therefore, is a method for connecting remote branch networks to storage within the centralized data center network, while maintaining a low total cost of ownership.

SUMMARY

Embodiments of the present invention provide an integrated iSCSI to FCoE gateway. The gateway may transfer data between an iSCSI device and a FCoE device. To allow a remote iSCSI initiator to access the Fiber Channel over an Ethernet-attached target, the gateway creates a "ghost" iSCSI node in the iSCSI network to represent the FCoE device, and a "ghost" FCoE node in the FCoE network to represent the iSCSI device. The gateway also creates a low-latency connection, referred to herein as the "fast path," between the two ghost nodes, so that the two devices can communicate with each other with minimal delay. The gateway creates sessions between the iSCSI device and the ghost iSCSI node, and between the FCoE device and the ghost FCoE node, to enable the iSCSI and FCoE devices to communicate with each other transparently using their native protocols.

For example, when the gateway receives packets from the iSCSI device according to the iSCSI protocol, the gateway translates the iSCSI packets into an analogous series of packets in the FCoE protocol. The converse is true for packets received from the FCoE device according to the FCoE protocol. Such translation may be performed, for example, by translating the contents of the received packets from one protocol into another within the same packets, or by extracting the commands and data from the received packets of a first protocol and translating the extracted commands and data into analogous commands and data which are inserted into new packets in the other protocol. In either case, the end result is to create packets which give the appearance that both the iSCSI and FCoE devices use the same protocol as each other.

For example, one embodiment of the present invention is directed to a method performed by a gateway. The method includes: (A) receiving an iSCSI packet containing an iSCSI protocol data unit (PDU) from a first iSCSI node using an iSCSI protocol; (B) (1) identifying an FCoE node based on contents of the iSCSI packet; (B) (2) creating a session table entry containing communication session mapping information between attributes of the first iSCSI node and attributes of an FCoE node; and (B) (3) initiating an iSCSI session between the first iSCSI node and an iSCSI ghost node corresponding to the FCoE node.

Another embodiment of the present invention is directed to a system comprising: an iSCSI network interface to receive a packet containing an iSCSI protocol data unit from a first iSCSI node using the iSCSI protocol; and a packet multi-core processor which is adapted to: identify an FCoE node based on contents of the iSCSI PDU; create a session table entry containing mapping information between attributes of the first iSCSI node and attributes of an FCoE node; and initiate an iSCSI session between the first iSCSI node and an iSCSI ghost node corresponding to the FCoE node.

Yet another embodiment of the present invention is directed to a method performed by a gateway. The method includes: (A) receiving an iSCSI packet containing an iSCSI protocol data unit (PDU) from a first iSCSI node using an iSCSI protocol; (B) (1) identifying an FCoE node based on contents of the iSCSI packet; (B) (2) creating an iSCSI ghost node corresponding to the FCoE node; and (B) (3) initiating an iSCSI session between the first iSCSI node and the iSCSI ghost node.

Yet a further embodiment of the present invention is directed to a system comprising: an iSCSI network interface to receive an iSCSI packet containing an iSCSI protocol data unit (PDU) from a first iSCSI node using an iSCSI protocol; and a packet multi-core processor adapted to: identify an FCoE node based on contents of the iSCSI packet; create an iSCSI ghost node corresponding to the FCoE node; and initiate an iSCSI session between the first iSCSI node and the iSCSI ghost node.

DETAILED DESCRIPTION

Embodiments of the present invention transparently allow iSCSI end nodes and FCoE end nodes to communicate with each other using their native protocols. A gateway enables this cross-protocol communication by receiving packets of one protocol (iSCSI or FCoE) and translating the actions (e.g., commands) specified by such packets into another analogous series of packets in the other protocol. Such translation may be performed, for example, by extracting the commands and data from the received packets and translating the commands and repackaging the data into new packets of the other protocol. As another example, the contents of the received packets may be translated from their original protocol to the other protocol. Either of these methods provides the appearance that both end nodes communicate using the same protocol as each other.

Figure 4:
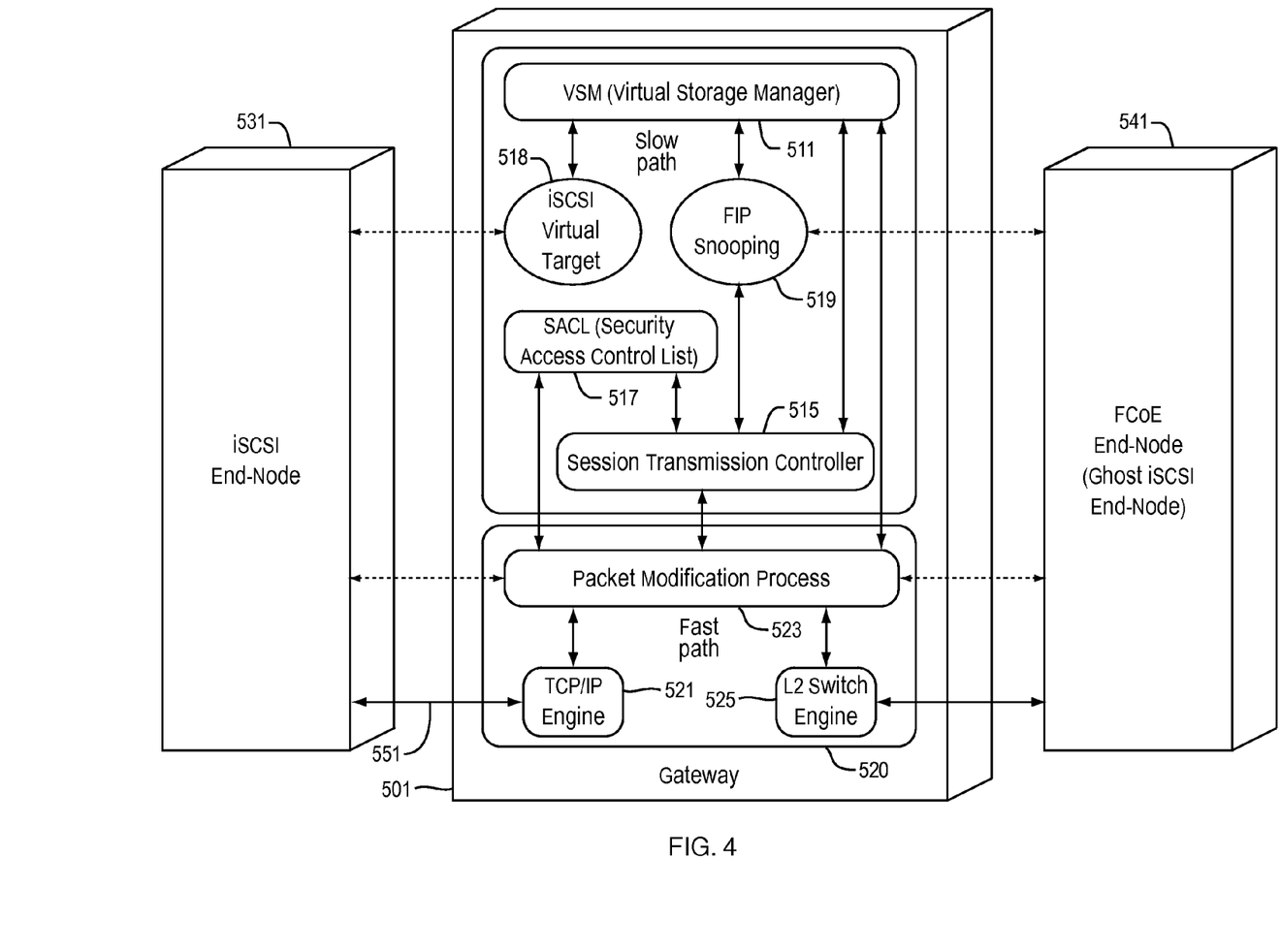
FIG. 4 is a functional diagram according to one embodiment of the present invention.
Figure 5:
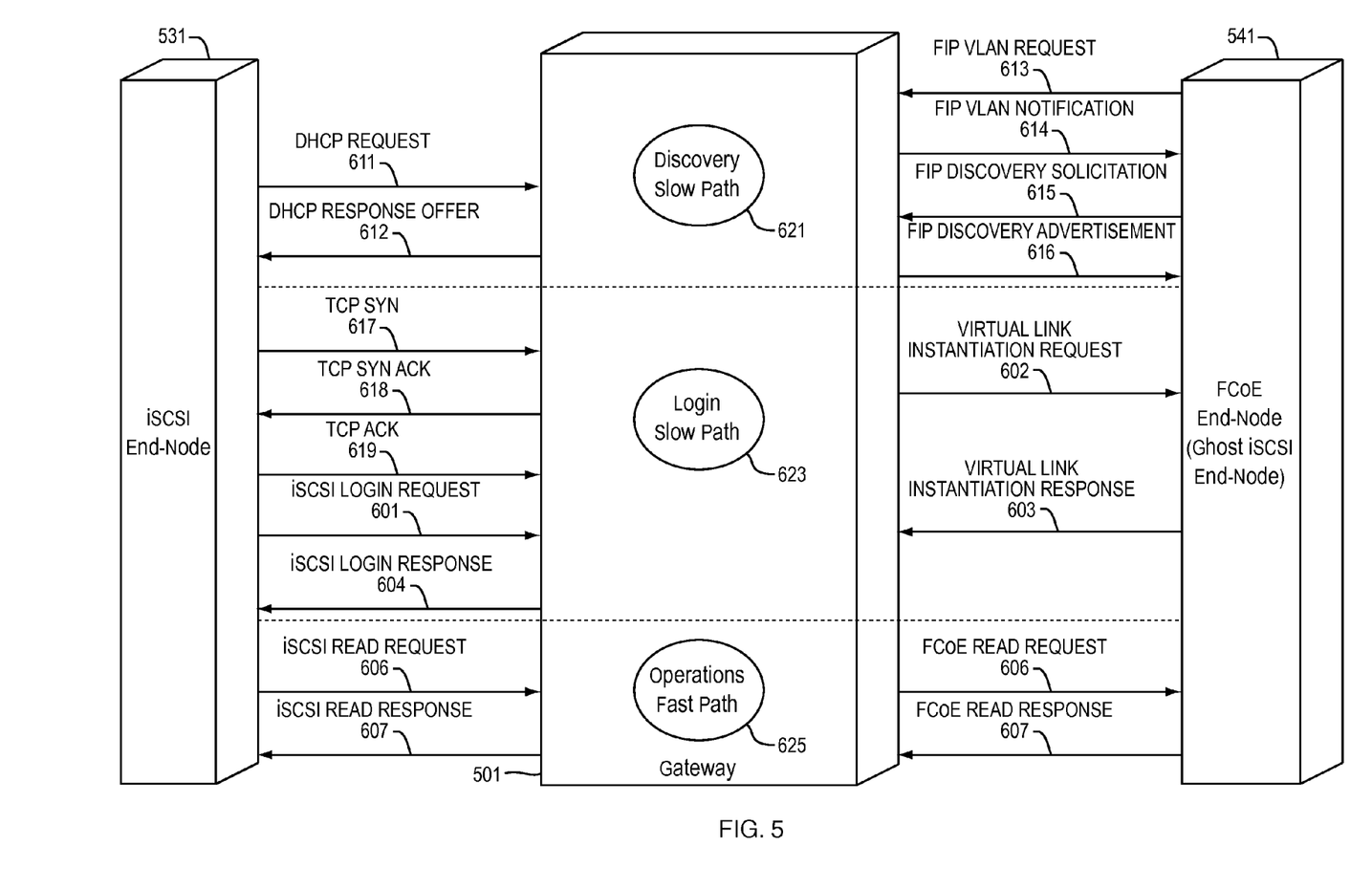
FIG. 5 is a diagram showing the packet exchange between the end nodes and the gateway according to one embodiment of the present invention.

Referring to FIG. 5, communication sessions in one embodiment of the invention include three phases: a Discovery (slow path) phase 621, a Login (slow path) phase 623, and an Operations (fast path) phase 625. The Discovery phase 621 enables both an iSCSI initiator and an FCoE target to be known by a Virtual Storage Manager (VSM) 511 of a gateway 501 (FIG. 4). In the Discovery phase 621, the gateway 501 configures the VSM 511 as the DHCP server to assign IP addresses to iSCSI end nodes, each of which is associated with a VLAN. The gateway 501 also assigns IP addresses to iSCSI "ghost" nodes and FCIDs to "ghost" FCoE nodes. Ghost nodes will be explained in more detail below.

An iSCSI end node 531 initiates a DHCP request 611 message in the VLAN. The VSM 511 in the gateway 501 receives the DHCP request message 611. In response, the VSM 511 adds one entry for the iSCSI end node 531 to a registration table in the gateway 501, and notifies a DHCP server module to send a DHCP Response Offer 612 to offer the IP address for the iSCSI client 531.

After one or more FCoE end nodes 541 become operational, they may send a FIP VLAN Request message 613 to the gateway 501 containing the VLAN list and its MAC address. The VSM 511 in the gateway 501 records the VLAN list and the MAC address of the FCoE end node 541, and responds with one or more FIP VLAN Notification messages 614, one per VLAN in the received VLAN list. Information received from this registration is stored in the gateway 501 to be used for the iSCSI registration according to the VLAN specified by the iSCSI client 531. The FCoE end node 541 responds to each FIP VLAN Notification message 614 with a FIP Discovery Solicitation message 615 containing the maximum FCoE size and bits indicating whether the MAC address was provided (by the end node or switch). The gateway 501 responds with a FIP Discovery Advertisement 616 containing Priority, name identifier, and MAC address of the fabric, the MAX FCoE size verification, and whether logins are supported.

This registration allows the VSM 511 to create an entry in the session, the SFT, and the AT tables in the gateway 501 that can assist the gateway 501 to implement a fast path communication session between the iSCSI initiator 531 and the FCoE target 541 created in the network layer. This enables the iSCSI end node 531 to use the iSCSI protocol to communicate with the FCoE end node 541 (represented by a ghost iSCSI end node 204a), because the gateway 501 transparently translates iSCSI communications from the iSCSI end node 531 into FCoE communications provided to the FCoE end node 541, and vice versa. Conversely, the FCoE end node 541 may communicate with the iSCSI end node 531 (represented by a ghost FCoE end node 202a), because the gateway 501 transparently translates FCoE communications from the FCoE end node 541 into ISCSI communications provided to the iSCSI end node 531, and vice versa.

In the next phase, the Login phase 623, the gateway 501 establishes one or more TCP sessions to carry the iSCSI communication. For example, the normal 3-way handshake using TCP SYN 617, TCP SYN ACK 618), and TCP ACK 619 messages may be used to authenticate the parties, negotiate the session parameters, and associate the TCP session(s) with iSCSI communication. The session parameters include MAXRecvDataSegmentLength and FirstBurstLength.

The VSM 511 configures a security access control list 517 to provide a secure session between the iSCSI network and FCoE network. This session is created during creation of the fast path and as the arbiter to control the fast path selection. The session table, SFT, and AT tables contains mapping information between FCoE network attributes and iSCSI network attributes, which are derived from the registration period in the VSM 511. These network attributes of the iSCSI and FCoE sessions are used by the gateway 501 to maintain a communication session between the iSCSI node 531 and iSCSI ghost node 204a, or between the FCoE node 541 and FCoE ghost node 202a, so that two nodes which communicate natively using different protocols can nonetheless communicate with each other.

Each iSCSI initiator (such as the iSCSI initiator 531) is assigned a VLAN. Each VLAN has its own layer 3 attributes, such as IP address, netmask, IP subnet, and gateway IP address; the FCoE iSCSI targets (such as FCoE target 541) are constrained to a VLAN domain, and FCoE targets can be discovered automatically. FCoE VLAN domains, or a mapping from VLAN domains, may be dynamically created to align with the VLAN view of the iSCSI initiators.

In embodiments of the invention, two different paths may be used to expedite FCoE and iSCSI packet processing. These are referred to as the "slow path" and the "fast path." In the slow path, iSCSI login commands trigger the gateway 501 to create an iSCSI session and an FCoE session. In the fast path, the processing of FCoE and iSCSI packets is expedited, by directly transforming the packets using a mapping between the two protocols to transform the packets from one protocol to the other, and to forward the transformed packets to their destinations.

iSCSI and FCoE end nodes may connect to the gateway 501, as shown in FIG. 4, in which iSCSI end node 531 and FCoE end node 541 connect to the gateway 501. This configuration enables iSCSI end nodes to communicate with FCoE end nodes (represented by ghost iSCSI end nodes) as if the iSCSI end nodes were communicating with other iSCSI end nodes. Similarly, FCoE end nodes can communicate with iSCSI end nodes (represented by ghost FCoE end nodes) as if the FCoE end nodes were communicating with other FCoE end nodes.

Figure 1:
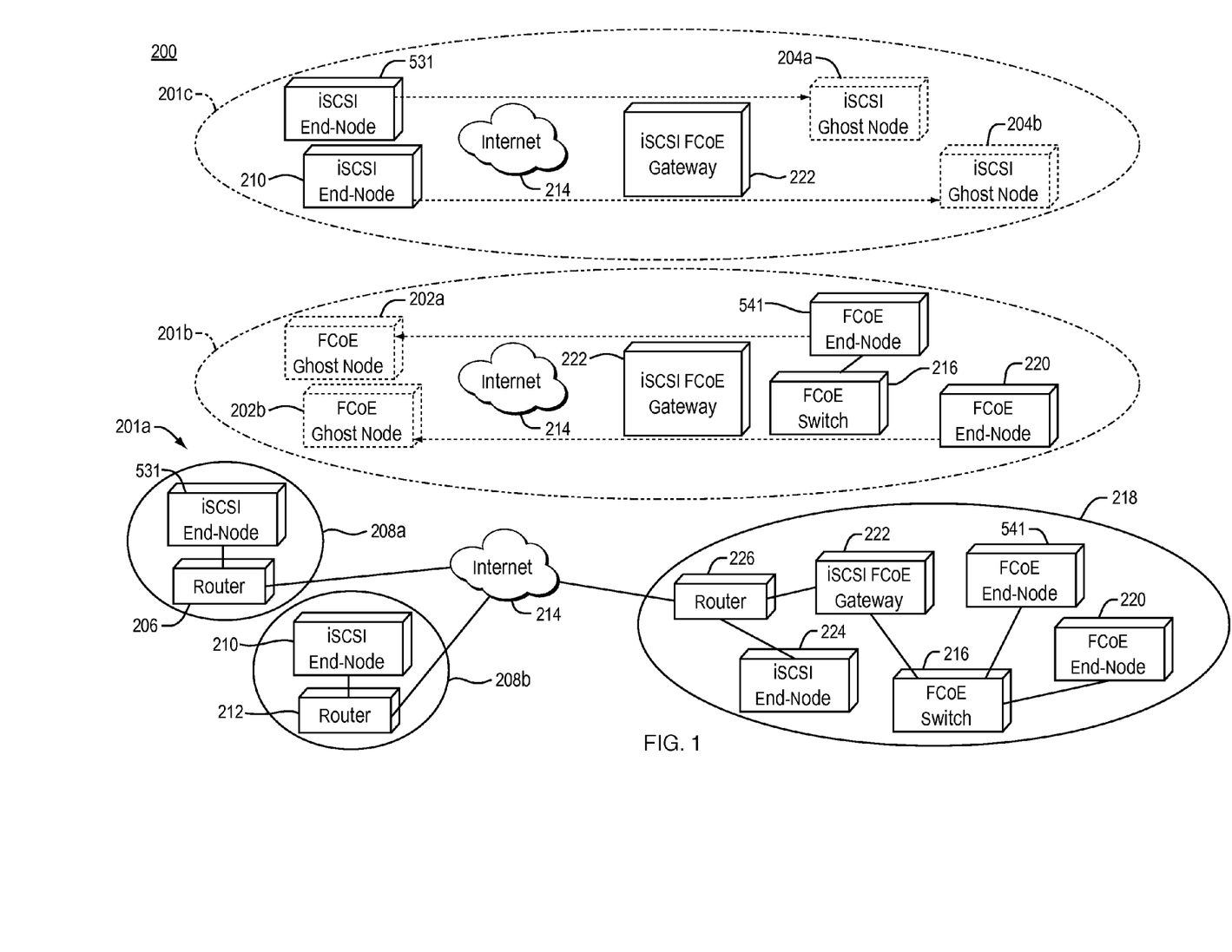
FIG. 1 illustrates a network diagram at the physical level, iSCSI virtual level, and FCoE virtual level according to one embodiment of the present invention.

Referring to FIG. 1, one physical view 201a and two protocol specific views 201b and 201c are shown of the same network. The physical network 201a includes the iSCSI end node 531, which is coupled to a router 206 within a LAN 208a. The physical network 201a also includes another iSCSI end node 210 coupled to another router 212 within another subnet 208b. Although only iSCSI end nodes 531 and 210, routers 206 and 212, and LANs 208a and 208b are shown in FIG. 1, the physical network 201a may include any number of such components and/or other components, in any configuration. LANs 208a-b, and the components they contain, are connected to the Internet 214 or other WAN.

The physical network 201a also includes FCoE end nodes 541 and 220, each of which is coupled to an FCoE switch 216 within a LAN 218. The physical network 201a also includes an iSCSI-FCoE gateway 222 and iSCSI end node 224, each of which is coupled to a router 226. The router 226 is coupled to the Internet 214 or other WAN.

From the FCoE point of view, the virtual network 201b comprises the FCoE end node 541, which is connected directly to FCoE ghost node 202a. The FCoE ghost node 202a in the virtual network 201b corresponds to and represents the iSCSI end node 531 in the physical network 201a. Similarly, the virtual network 201b includes FCoE end node 220, which is connected directly to FCoE ghost node 202b. The FCoE ghost node 202b in the virtual network 201b corresponds to and represents the iSCSI end node 210 in the physical network 201a.

From the iSCSI point of view, the virtual network 201c comprises the iSCSI end node 531, which is connected directly to iSCSI ghost node 204a. The iSCSI ghost node 204a in the virtual network 201c corresponds to and represents the FCoE end node 541 in the physical network 201a. Similarly, the virtual network 201c includes iSCSI end node 210, which is connected directly to iSCSI ghost node 204b. The iSCSI ghost node 204b in the virtual network 201c corresponds to and represents the FCoE end node 220 in the physical network 201a.

Figure 3:
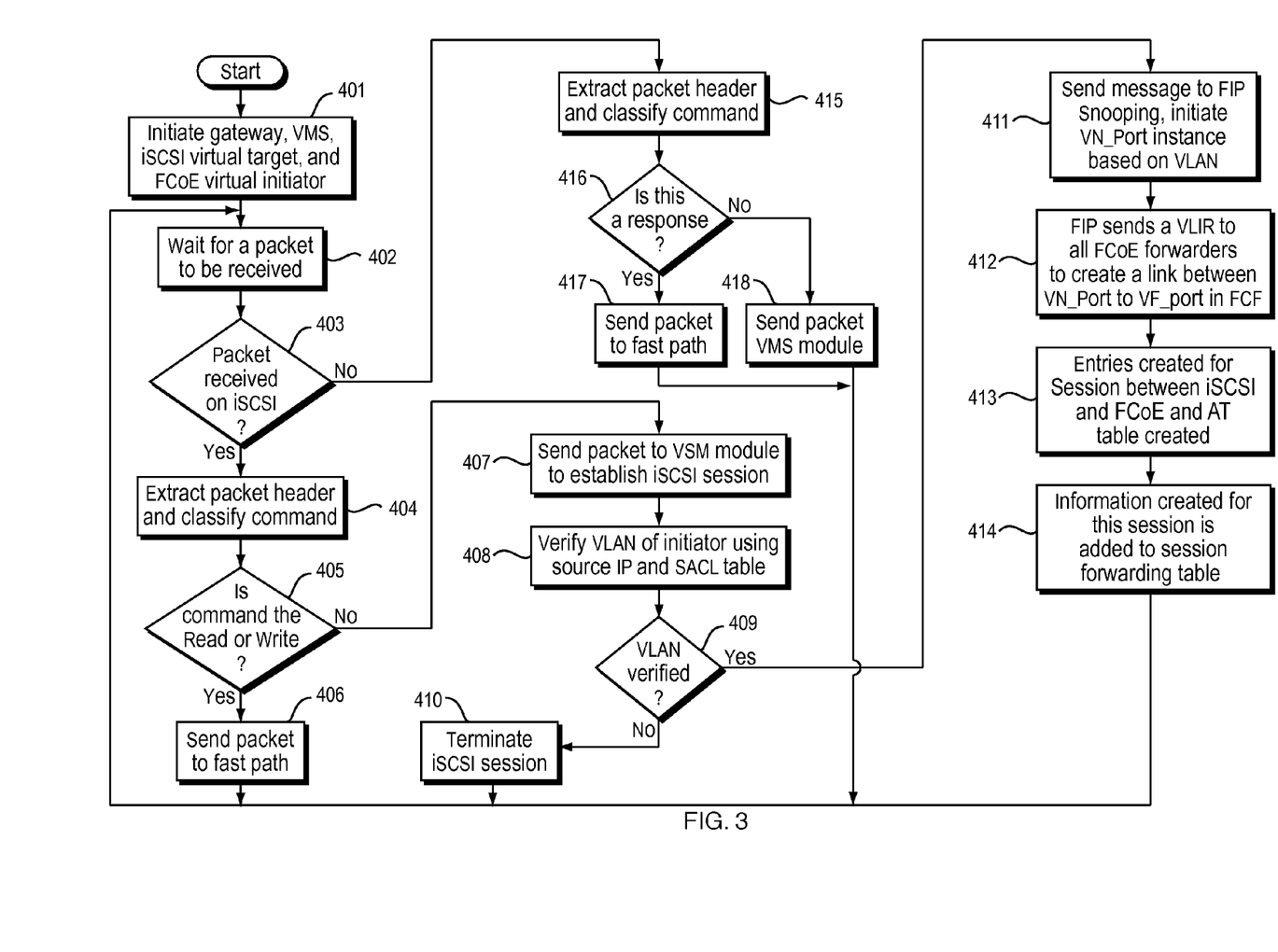
FIG. 3 is a flowchart according to one embodiment of the present invention.

Referring to FIG. 3, a general flow chart of the operation of the gateway 501 is shown according to one embodiment of the present invention. First, the gateway 501 goes through initialization, in which the iSCSI clients use DHCP to discover the DHCP server (VSM 511), and in which the VSM 511 uses the FIP protocol to discover the FCoE targets.

More specifically, referring to FIG. 5, iSCSI client 531 initiates a DHCP request 611 in a VLAN. The VSM 511 in the gateway 501 receives the DHCP request packet 611, which typically is sent as a DHCP relay unicast packet. The VSM 511 also responds to a FIP VLAN Requests on the FCoE network to FCoE target 541 using a VLAN Request packet 613 and responds with a VLAN Notification packet 614. The FCoE target also sends FIP Discovery Solicitation packet 615 and the VSM 511 responds with a FIP Discovery Advertisement packet 616. The VSM 511 checks the VLAN ID in the DHCP packet to determine if it matches a VLAN discovered on the FCoE or is associated with a VLAN on the FCoE side (whether, for example, as a result of a preconfigured association or runtime synchronized association). If the VLAN ID does not match the discovery VLAN ID, the VSM 511: (1) sends a response 612 to notify the iSCSI client 531 that registration failed, and (2) adds an entry to the SACL table 517 to deny further DHCP relay requests from this iSCSI client 531 on this VLAN. Otherwise, if the VLAN ID does match, the VSM 511 adds an entry in the registration table and notifies the DHCP server module in the gateway 501 to send a DHCP reply packet 612 to offer an IP address for this iSCSI client 531.

The registration process described above allows the VSM 511 to create an entry in the session table that can assist the gateway 501 to implement a fast path network route for a session between the iSCSI initiator 531 and the FCoE target 541, created in the network layer. The result is that iSCSI end nodes (e.g., end node 531) can communicate with FCoE end nodes (e.g., end node 541), represented by ghost iSCSI end nodes (e.g., nodes 204a-b), where the iSCSI end nodes believe they are communicating with other iSCSI end nodes which are actually FCoE end nodes, which the gateway 501 represents as iSCSI ghost nodes. Conversely, FCoE end nodes (e.g., end node 541) can communicate with iSCSI end nodes (e.g., end node 531), represented by ghost FCoE end nodes (e.g., nodes 202a-b), where the FCoE end nodes believe they are communicating with other FCoE end nodes which are actually iSCSI end nodes, which the gateway 501 represents as FCoE ghost nodes.

The registration phase described above may, for example, establish mappings which associates an iSCSI client node name with an iSCSI virtual target name, an iSCSI virtual target IP address and TCP port, and a VLAN ID 401. After initialization is complete, the gateway 501 waits for a packet to be received 402. Now, also referring to FIG. 4, the iSCSI end node 531 initiates a communication session by sending an iSCSI Login command to ghost iSCSI end node 541. The gateway 501 receives the packet containing the iSCSI Login command. This is also shown in FIG. 5, in which the iSCSI end node 531 sends iSCSI Login command 601 to a ghost iSCSI end node, and in which the gateway 501 receives the packet containing the Login command 601. In FIG. 4, the IP network interface 521 receives the packet, identifies its destination, and passes the packet to the Packet Modification Process 523 to process the packet. The Packet Modification Process 523 extracts the packet's header information and classifies the command (FIG. 3, operation 404). The command is checked 405 to determine if it is a read or write command which can be processed by the fast path. Since, in the present example, the command is a Login command rather a read or write command, the Login command is passed to the VSM 511 in FIG. 4 (FIG. 3, step 407).

The VSM 511 creates an iSCSI virtual target 518 to respond to the Login command 601, and forms the context of the iSCSI command context, which will be used to terminate the iSCSI session and to initiate the FCoE session. The VSM 511 registers the iSCSI initiator 531 with the Session Transmission Controller (STC) 515, where the node name and IP address of the iSCSI end node 531 is logged in a Session Forwarding Table (SFT) (not shown, but part of STC 515). The Session Transmission Controller (STC) 515 verifies the VLAN and IP address of the iSCSI end node 531 using the Security Access Control List (SACL) 517 as shown in FIG. 3, steps 408 and 409. If the VLAN and address of the iSCSI end node 531 is not valid then the session is terminated and the iSCSI virtual target 518 is deleted 410.

If the VLAN and address of the iSCSI end node 531 is valid, then the STC 531 sends a message to the FIP Snooping module 519 to initiate a VN_Port instance based on the VLAN (FIG. 3, step 411). Referring to FIG. 5, the FIP Snooping module 519 sends a Virtual Link Instantiation Request 602 to the FCoE node 541 to create a link between VN_port to VF_port in the Fibre Channel Fabric (FCF) as a result of receiving the Login message 601 to establish a connection with the iSCSI ghost node 541 (FIG. 3, step 412). A Virtual Link Instantiation Response message 603 is received by the gateway 501. This response message 603 informs the gateway 501 that a connection has been established. Therefore, in response to receiving the message 603, the gateway 501 creates entries for a session between SCSI and FCoE nodes, including an Adjacent Table (AT) entry (FIG. 3, step 413). The gateway 501 also creates and adds a session entry to the session forwarding table (FIG. 3, step 414).

Now the gateway 501 knows that the ghost iSCSI end node 204a is reachable, and since security policies allow communication from the initiator iSCSI end node 531, the gateway 501 sends an iSCSI Login Response message 604 out the IP interface 521 back to the initiator iSCSI end node 531. The gateway 501 goes back to waiting for another packet to arrive (FIG. 3, step 402). The initiator iSCSI end node 531 receives the Login Response message 604 and knows that the ghost iSCSI end node 204a can now be accessed. The initiator iSCSI end node 531 sends an iSCSI read command 605 to the ghost iSCSI node 204a. This read command 605 is received by the gateway 501 IP interface 521.

Referring to FIG. 3, the gateway 501 receives an iSCSI packet (step 403), and extracts the packet header and classifies the command contained in the packet (step 404). The gateway 501 determines whether the received packet is a read or write command (step 405). In the present example, the packet is a read command, so the gateway 501 passes the packet (step 406) from the iSCSI IP interface 521 to the fast path packet modification process 523 (step 406). The fast path packet modification process 523 looks up an entry in the SFT that is associated with a communication session between the end node that sent the packet and its recipient. Since the SFT entry was created earlier as a result of the iSCSI login command exchange with the ghost iSCSI end node, the packet modification process 523 translates the received packet by using fields in the iSCSI command packet and information in the SFT entry to fill in the fields of the equivalent FCoE command packet 606, which the gateway 501 transmits to the ghost iSCSI end node (i.e., FCoE end node).

Embodiments of the present invention may provide cross-protocol communication in a variety of ways. For example, in one embodiment, the gateway 501 translates the incoming packet into one or more outgoing packets using the data found in the incoming packet and information stored in the gateway 501 about a communication session between the sender of the packet and its intended recipient. In another embodiment, the gateway 501 passes information, found in the payload section of the incoming packet, to logic that translates the commands and data in the incoming packet into outgoing commands and data, which are passed down a protocol stack of the other protocol to create an outgoing packet or packets.

Figure 2:
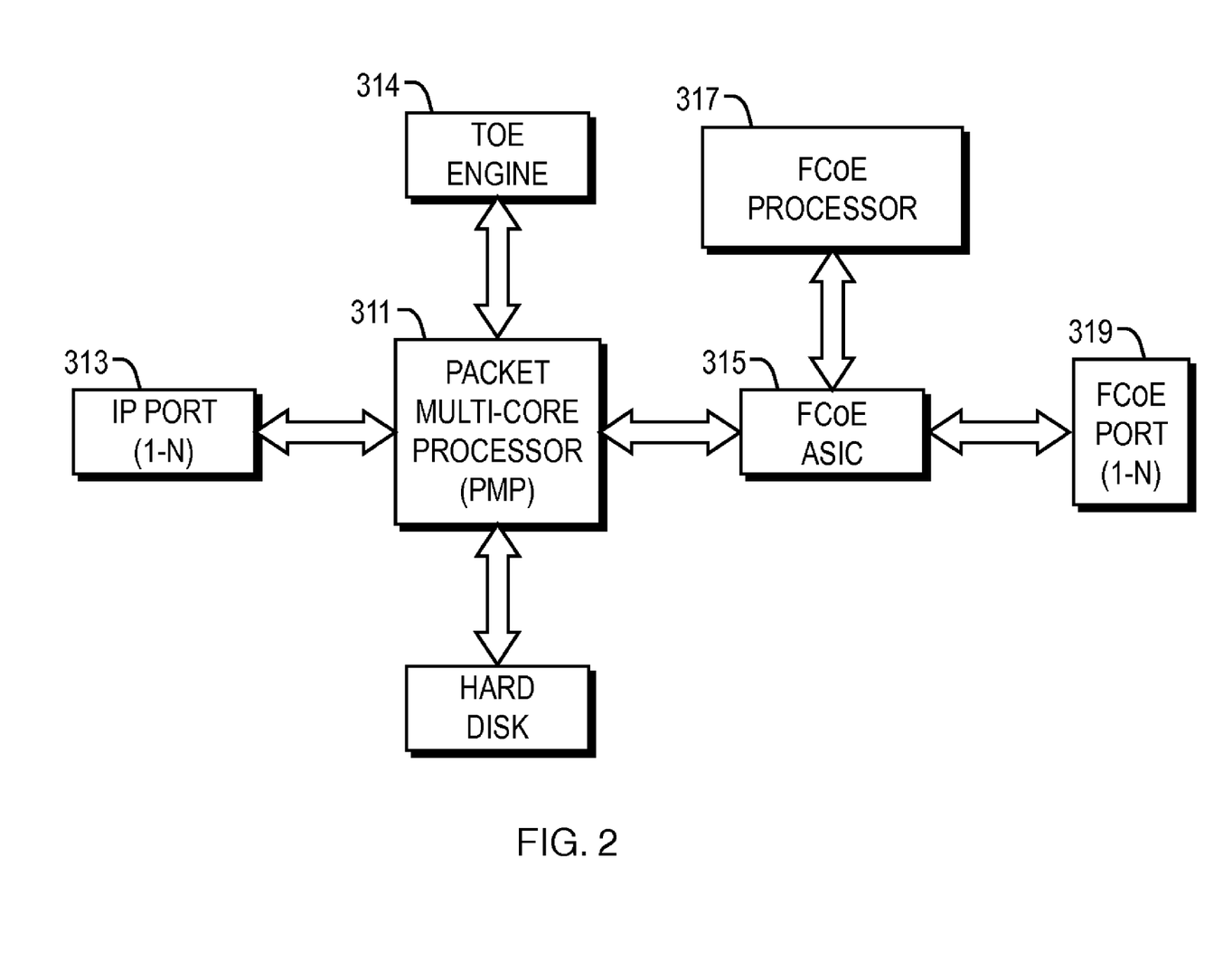
FIG. 2 is a hardware block diagram according to one embodiment of the present invention.
Figure 6A:
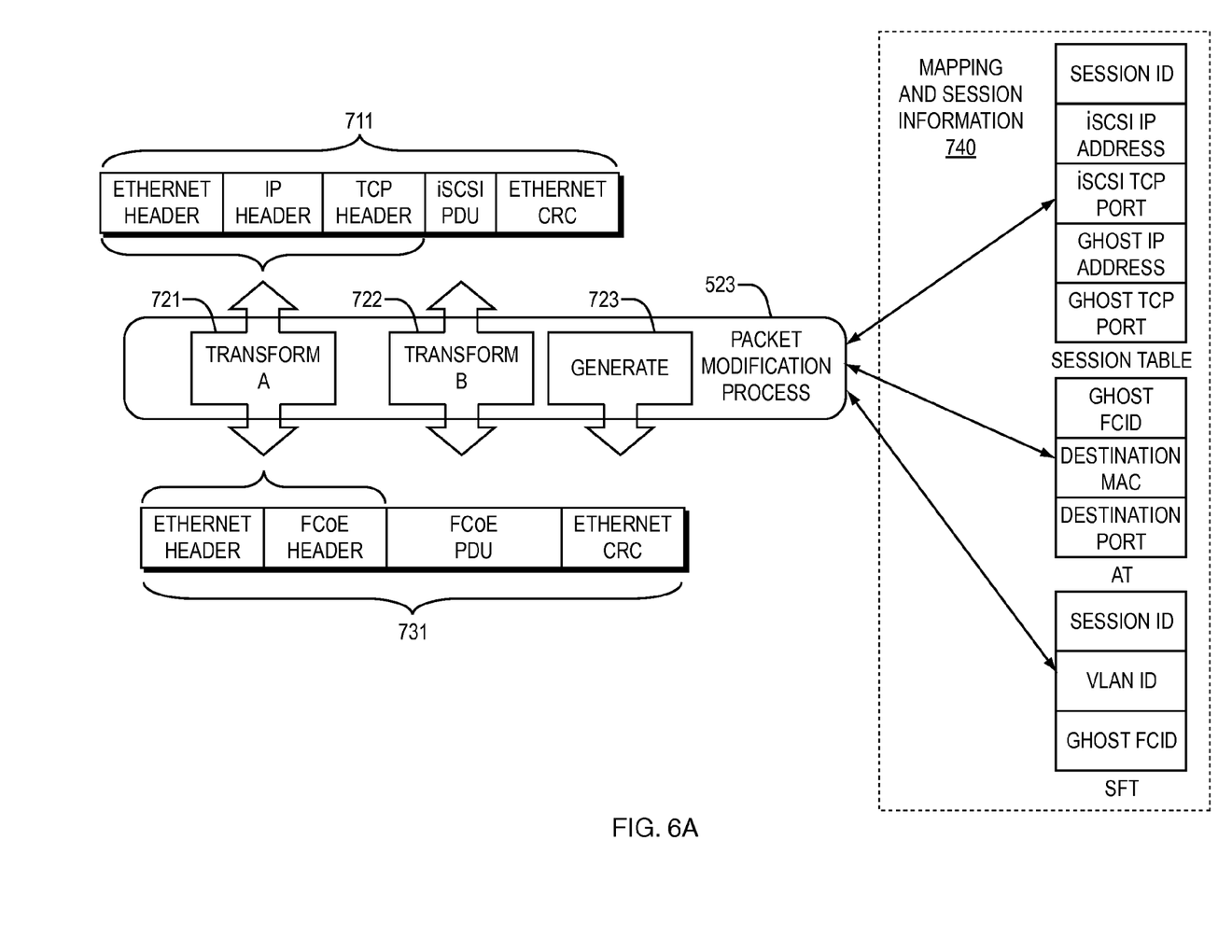
FIGS. 6A-6C are diagrams illustrating the conversion of an iSCSI packet into an FCoE packet according to one embodiment of the present invention.
Figure 6B:
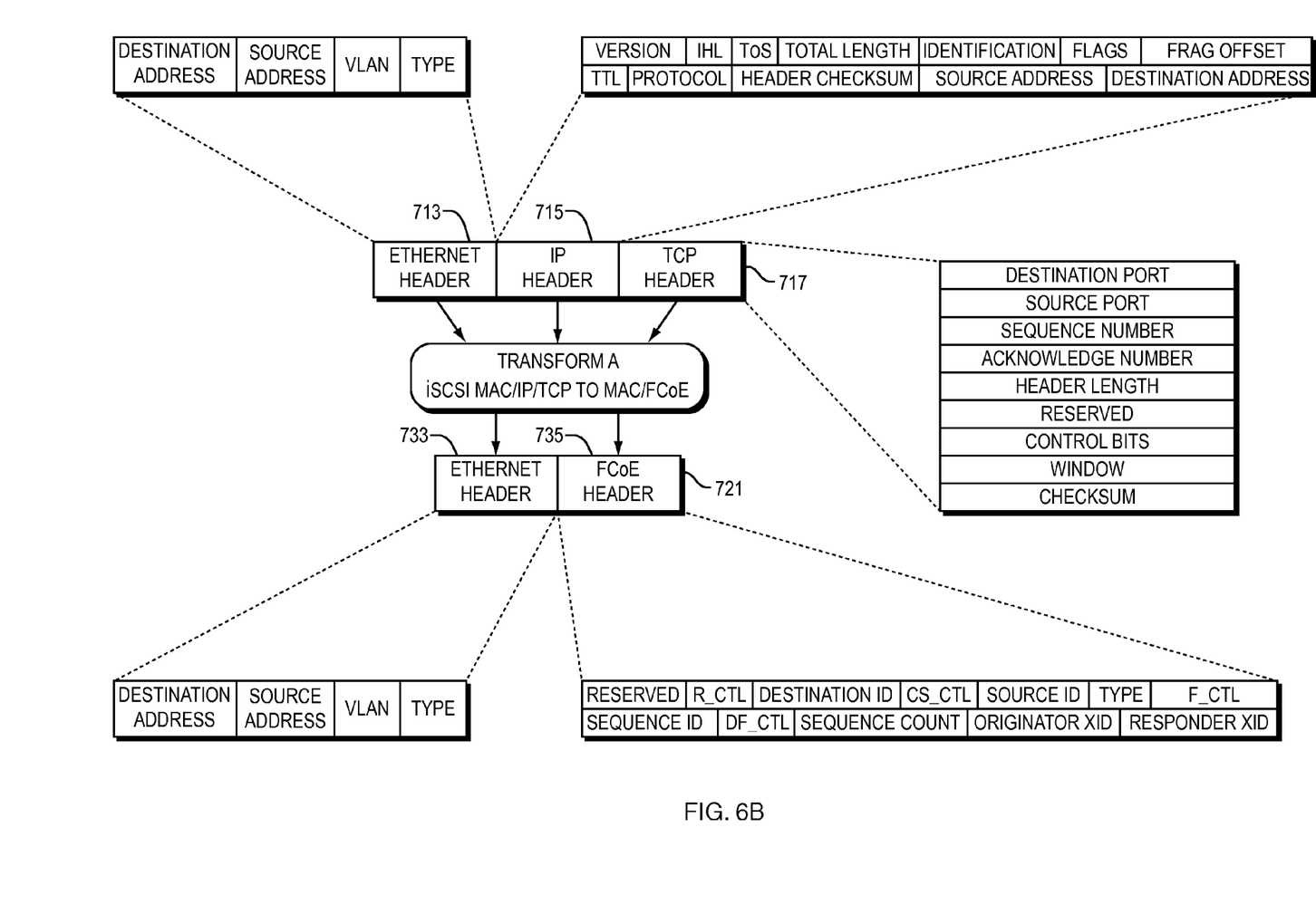

Referring to FIGS. 2, 6A, and 6B, the received iSCSI packet, along with session and mapping information stored in Packet Multi-core Processor (PMP) 311 memory, is used to either create an FCoE packet from scratch or to transform the received iSCSI packet into the FCoE packet to be transmitted on the FCoE network interface. The Packet Modification Process 523 reads an incoming iSCSI packet 711 and the Mapping and Session Information 740 to create an FCoE packet 731. Referring to FIG. 6B, Transform A 721 reads the MAC header 713, IP header 715, and TCP header 717 of the iSCSI packet 711. The Destination address is checked to verify that the gateway's MAC address is in the IP Port module 313. The Source address may be used to check if it is associated with the Source IP Address in the IP header by the IP Port module 313 and possibly by the TCP/IP Engine 521. The VLAN and Type fields are read by the IP Port module 313 to check for IP protocol type and to verify that the VLAN ID is enabled on the receive port.

Transform A 721 reads and verifies fields of the IP header 715, such as version header length and checksum, as standard IP protocol practices by the IP Port module 313 and possibly by the TCP/IP Engine 521. Other fields of the IP header are later read by the Packet Multi-core Processor (PMP) 311, such as Frag Offset and Flags, to generate a Fibre Channel (FC) exchange sequence count in the FC header. The IP Port module 313 reads the Protocol field of the IP header 715 to determine if it indicates that this is a TCP protocol.

If it is the TCP protocol, then the packet is passed to the TCP Offload Engine (TOE) 314. The TOE reads and verifies the TCP protocol TCP header fields, such as sequence number, acknowledgement number, control, and checksum according to the TCP protocol rules. If the TCP header indicates an iSCSI payload, then the TOE module 314 passes the packet to the Packet Modification Process 523, implemented on the Packet Multi-core Processor (PMP) 311.

The Packet Modification Process 523 reads the destination and source IP addresses from the IP header 715 and the TCP destination and source ports numbers from the TCP header 717. Packet Modification Process 523 searches the Session Table, which is part of the Mapping and Session Information 740, to match destination IP address to Ghost IP address, source IP address to iSCSI IP address, TCP port to Ghost TCP port, and source TCP port to iSCSI TCP port. When a match is found, the session ID is read from that table entry. The Packet Modification Process 523 uses the session ID to search the SFT to find a matching entry. The VLAN ID and Ghost FCID fields of the matched entry are read. The Packet Modification Process 523 uses the Ghost FCID to search the AT to find a matching entry. The Ghost MAC address and Ghost Port fields of the matched entry are read.

Transform A 721, running on the PMP 311, now has the information to create the MAC and FCoE headers for the packet to be transmitted. The Ethernet header 733 Destination MAC address is written with the value of the Ghost MAC address field read from the matched AT entry; the Source MAC address written as the MAC address associated with the gateway's FCoE port as indicated by Ghost Port value read from the matched AT entry. The VLAN header is written with the VLAN ID value read from the matched SFT entry and the Type field is written as FCoE.

Transform A 721 writes the FCoE header 735 fields; Destination ID is written as the Ghost FCID value from the matched SFT entry and Source ID is written with the FCID associated with ghost FCoE ID. State is kept about the iSCSI/TCP session. Using this state information, the PMP 311 fills in the Routing control (R_CTL), the Class specified Control (CS_CTL), Type, Frame Control (F_CTL), Sequence ID, Date Field Control (DF_CTL), Sequence Count, Originator XID, and Responder XID fields with corresponding values to the iSCSI/TCP session values.

Figure 6C:
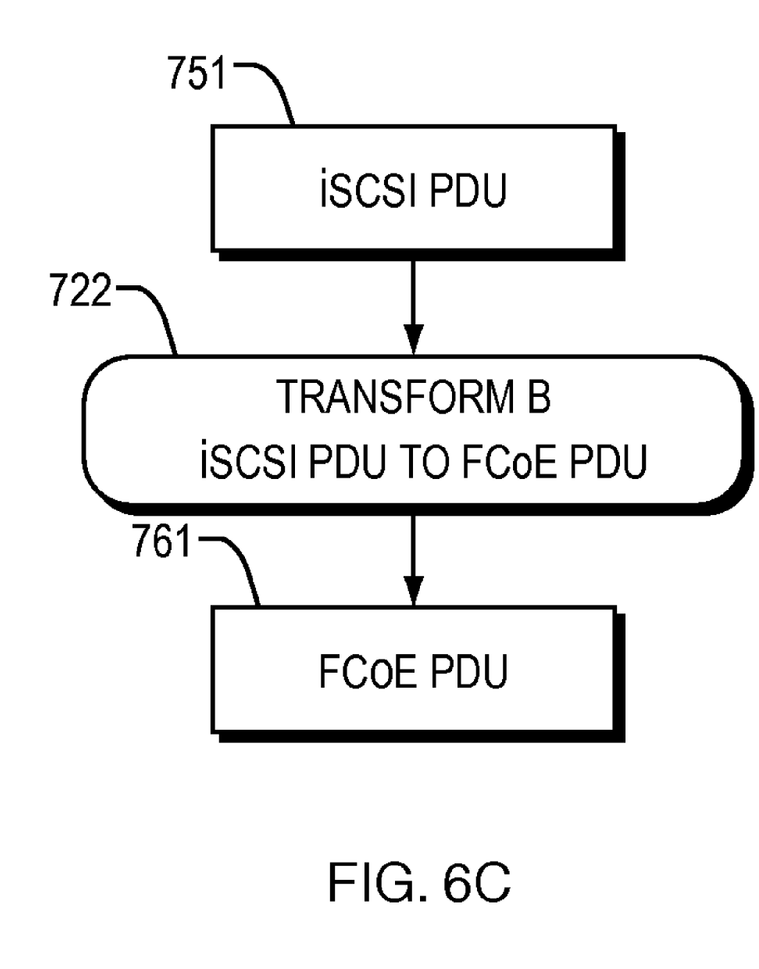

Referring to FIG. 6C, Transform B 722 reads the iSCSI protocol data unit (PDU) 751 and writes the FCoE PDU 761. Each command and any associated data, if present, is read from the iSCSI PDU 751 and translated into one or more FCoE commands and data, which are written into the FCoE PDU 761 by the PMP 311. After the outgoing FCoE frame has been written, the CRC is calculated by reading the data of the Ethernet packet 731, starting with the Destination Address field and ending at the end of the FCoE PDU. The calculated CRC is written into the packet 731 before being transmitted on the gateway FCoE interface by the FCoE Port 319.

The FCoE end node 541 receives the FCoE Read Request command packet 606, executes the Read Request command, and returns the results in an FCoE Read Response packet 607. The gateway 501 receives the FCoE Read Response packet 607 from the FCoE interface 403. The Packet Modification Process extracts the packet header and reads the command contained in the packet (FIG. 3, step 415). This is a response packet, so it is sent (step 417) to the fast path packet modification process 523. The fast path packet modification process 523 looks up an entry in the SFT that is associated with a communication session between these two end nodes. The fast path packet modification process 523 translates the received packet by using fields in the FCoE response packet and information in the SFT entry to fill in the fields of the equivalent iSCSI response packet 608.

Referring to FIGS. 2, 4, 7A, and 7B, the gateway 501 L2 Switch Engine 525, implemented on FCoE Port 319, receives the FCoE response 831, reads and verifies the Destination MAC field of the Ethernet header 833, matches the MAC address assigned to the gateway 501, and verifies that the VLAN ID field of the Ethernet header 833 is enabled on the receive port. The FCoE ASIC (315) and FCoE Processor (317) check the Type field of the Ethernet header 833 to determine whether it matches the FCoE ethertype value. If there is a match, the packet is passed to Packet Modification Process 523, which is implemented on the Packet Multi-core Processor (PMP) 311.

Figure 7A:
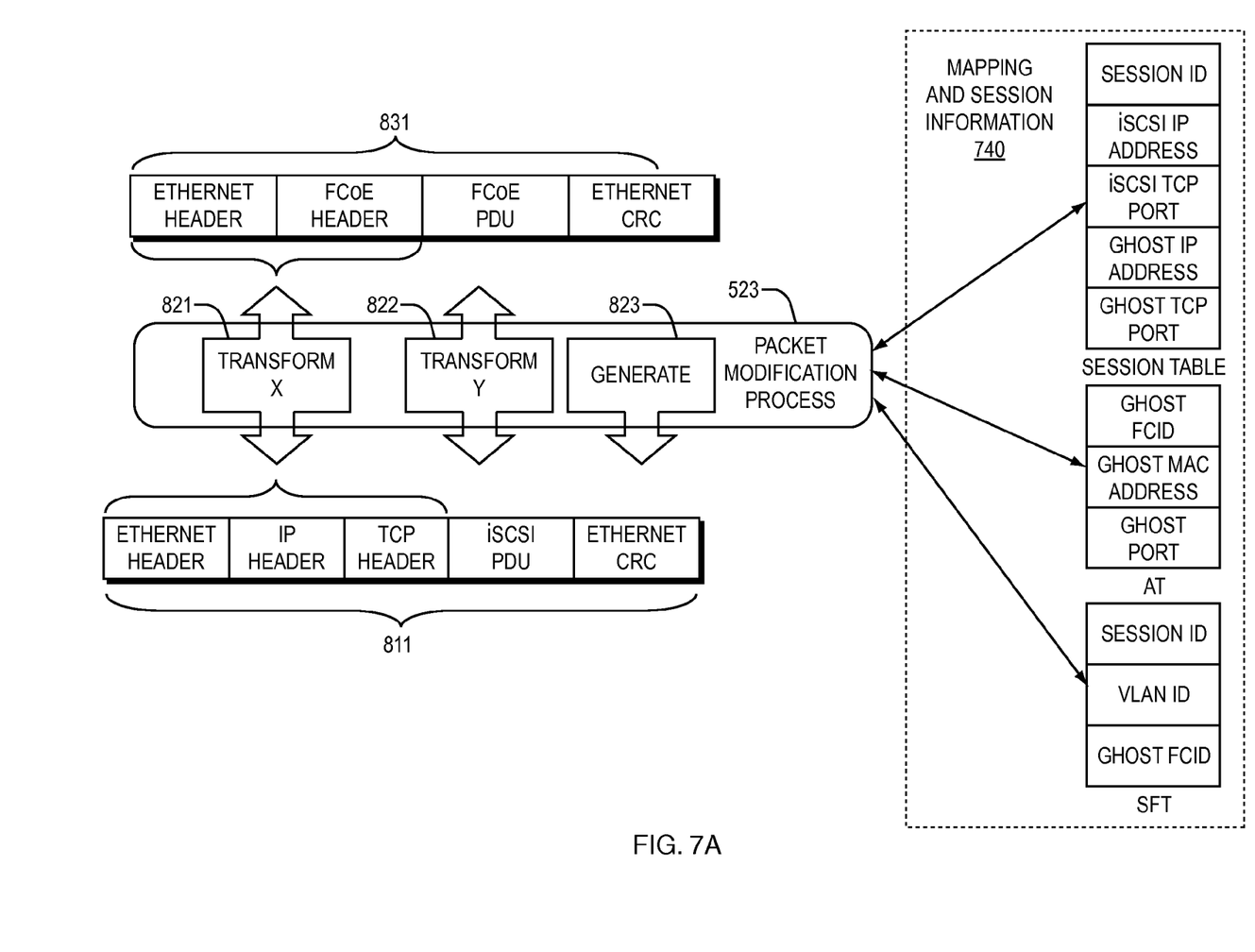
FIGS. 7A-7C are diagrams illustrating the conversion of an FCoE packet into an iSCSI packet according to one embodiment of the present invention.
Figure 7B:
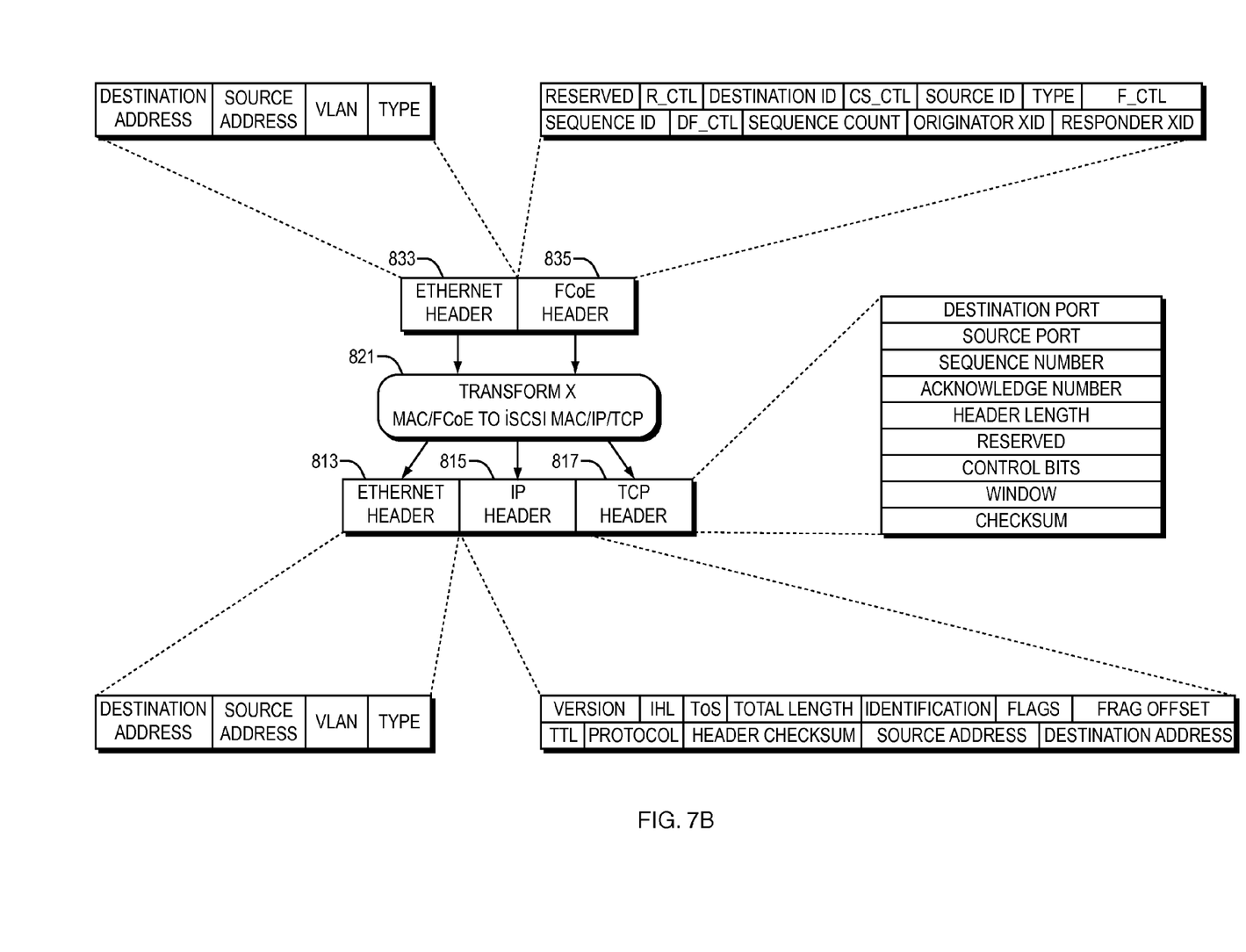

The Packet Modification Process 523 reads the Source Address field of the Ethernet header 833 and searches the AT table for an entry that matches the Ghost MAC Address field value. The Packet Modification Process 523 verifies that the receive port equals the Ghost Port value and reads the Ghost FCID value. The Packet Modification Process 523 searches the SFT table for an entry that matches the read Ghost FCID value. If a match is found, then the Packet Modification Process 523 reads the VLAN ID and Session ID field values from the matched entry. The Session ID value is used to search the Session Table for an entry that matches the Session ID field. If a match is found, then the Packet Modification Process 523 reads the iSCSI IP address, iSCSI TCP Port, Ghost IP address, and Ghost TCP IP field values from the matched entry.

The Packet Modification Process 523 writes the Destination MAC address field of the Ethernet header 813 with the MAC address associated in the ARP with the IP address equal to the value of iSCSI IP address field of the matched entry. The Packet Modification Process 523 writes the Source MAC address field of the Ethernet header 813 with the gateway's MAC address field of the IP header 815, determined by the Ghost IP address field of the matched entry. The Packet Modification Process 523 writes the VLAN ID of the Ethernet header 813 with the value read from the VLAN ID field of the match entry in the SFT table. The Packet Modification Process 523 writes the type field of the Ethernet header 813 with the ethertype value for IP.

The Packet Modification Process 523 writes the Destination IP address field of the IP header 815 with the value of the iSCSI IP address field of the matched session table entry, and writes the Source IP address field of the IP header 815 with the value of the Ghost IP address field of the matched session table entry. The Packet Modification Process 523 writes the Protocol field of the IP header 815 to equal TCP. The Packet Modification Process 523 writes the Destination Port field of the TCP header 817 with the value of the iSCSI TCP Port field of the matched session table entry, and writes the Source Port field of the TCP header 817 with the value of the Ghost TCP Port field of the matched session table entry.

Figure 7C:
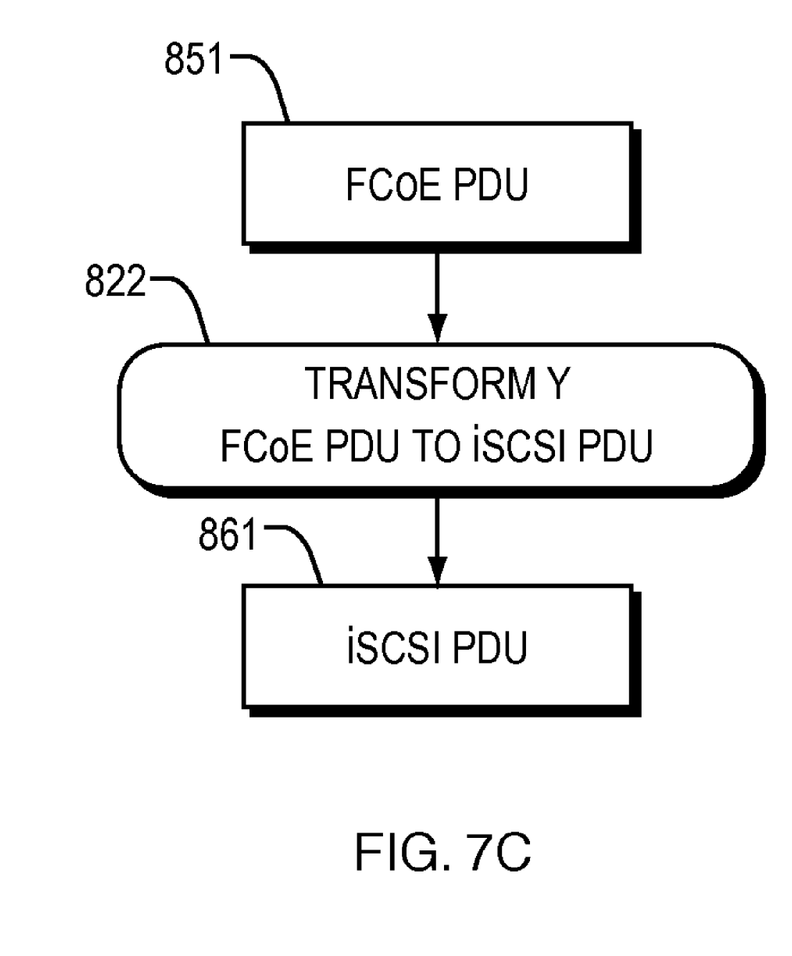

Referring to FIG. 7C, Transform Y 822 of the Packet Modification Process 523, implemented on the PMP 311, reads the FCoE PDU 851, and writes the iSCSI PDU 861 before the packet is passed to the TCP/IP Engine, implemented on the PMP 311 and IP Port 313, where the CRC is calculated and written into CRC field of the Ethernet packet 811, before being transmitted on the iSCSI Ethernet interface of the gateway 501.

The iSCSI end node 531 receives the iSCSI Read Response packet 608 and the command is completed as if the ghost node 204a were another physical iSCSI node on the IP network.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method performed by a gateway, the method comprising:
  (A) receiving an Internet Small Computer System Interface (iSCSI) packet containing an iSCSI protocol data unit (PDU) from a first iSCSI node using an iSCSI protocol;
  (B)
    (B)(1) identifying a Fibre Channel over Ethernet (FCoE) node based on contents of the iSCSI packet;
    (B)(2) creating a session table entry containing communication session mapping information between attributes of the first iSCSI node and attributes of an FCoE node; and
    (B)(3) initiating an iSCSI session between the first iSCSI node and an iSCSI ghost node corresponding to the FCoE node, wherein the iSCSI ghost node is a virtual representation of the FCOE node in a physical network.

2. The method of claim 1, wherein (B) further comprises:
(B)(4) determining whether the iSCSI PDU in the iSCSI packet contains a login command; and
(B)(5) performing (B)(1), (B)(2), and (B)(3) in response to determining that the iSCSI PDU in the iSCSI packet contains a login command.

3. The method of claim 2, wherein (B)(4) comprises:
(B)(4)(a) determining whether the iSCSI PDU in the iSCSI packet contains a read command or a write command; and
(B)(4)(b) determining that the iSCSI PDU in the iSCSI packet contains a login command if the iSCSI PDU in the iSCSI packet is not determined to contain a read command or a write command.

4. The method of claim 1, wherein (B) further comprises:
(B)(4)(c) before (B)(3), creating the iSCSI ghost node corresponding to the FCoE node.

5. The method of claim 1, further comprising:
(C)
(C)(1) storing FCoE data in an FCoE packet based on the mapping information and iSCSI data from the iSCSI packet.

6. The method of claim 5, wherein (C) further comprises:
(C)(2) transmitting the FCoE packet to the FCoE node using a FCoE protocol.

7. The method of claim 6, wherein (C) further comprises:
(C)(3) before (B)(1), determining whether the iSCSI PDU contains a read command; and
(C)(4) performing (C)(1) and (C)(2) in response to determining that the iSCSI PDU contains a read command.

8. The method of claim 6, wherein (C) further comprises:
(C)(3) before (B)(1), determining whether the iSCSI PDU contains a write command; and
(C)(4) performing (C)(1) and (C)(2) in response to determining that the iSCSI PDU contains a write command.

9. The method of claim 6, wherein (C)(1) comprises converting the iSCSI packet into the FCoE packet.

10. The method of claim 5, wherein (C)(1) comprises:
(C)(1)(a) creating the FCoE packet;
(C)(1)(b) translating at least one iSCSI command and at least one iSCSI datum from the iSCSI packet into at least one analogous FCoE command and at least one analogous FCoE datum; and
(C)(1)(c) storing the at least one analogous FCoE command and at least one analogous FCoE datum in the FCoE packet.

11. A system comprising:
an Internet Small Computer System Interface (iSCSI) network interface to receive a packet containing an iSCSI protocol data unit from a first iSCSI node using the iSCSI protocol;
a packet processor to:
identify a Fibre Channel over Ethernet (FCoE) node based on contents of the iSCSI PDU;
create a session table entry containing mapping information between attributes of the first iSCSI node and attributes of an FCoE node; and
initiate an iSCSI session between the first iSCSI node and an iSCSI ghost node corresponding to the FCoE node, wherein the iSCSI ghost node is a virtual representation of the FCOE node in a physical network.

12. The system of claim 11, wherein the packet processor is further to:
determine whether the iSCSI PDU in the iSCSI packet contains a login command; and
identify the FCoE node, create the session table entry, and initiate the iSCSI session in response to determining that the iSCSI PDU in the iSCSI packet contains a login command.

13. The system of claim 12, wherein the packet processor is to determine whether the iSCSI PDU contains the login command by:
determining whether the iSCSI PDU in the iSCSI packet contains a read command or a write command; and
determining that the iSCSI PDU in the iSCSI packet contains a login command if the iSCSI PDU in the iSCSI packet is not determined to contain a read command or a write command.

14. The system of claim 11, wherein the packet processor is further to:
create the iSCSI ghost node corresponding to the FCoE node.

15. The system of claim 11, wherein the packet processor is further to:
store FCoE data in an FCoE packet based on the mapping information and iSCSI data from the iSCSI packet.

16. The system of claim 15, further comprising:
an FCoE network interface to transmit the FCoE packet to the FCoE node using a FCoE protocol.

17. The system of claim 16, wherein the packet processor is further to:
determine whether the iSCSI PDU contains a read command; and
wherein the packet processor is adapted to store the FCoE data in the FCoE packet, and the FCoE network interface is adapted to transmit the FCoE packet, in response to determining that the iSCSI PDU contains a read command.

18. The system of claim 16, wherein the packet processor is further to:
determine whether the iSCSI PDU contains a write command; and
wherein the packet processor is adapted to store the FCoE data in the FCoE packet, and the FCoE network interface is adapted to transmit the FCoE packet, in response to determining that the iSCSI PDU contains a write command.

19. The system of claim 16, wherein the packet processor is to store the FCoE data in the FCoE packet by performing acts including converting the iSCSI packet into the FCoE packet.

20. The system of claim 15, wherein the packet processor is to store the FCoE data in the FCoE packet by performing acts including:
creating the FCoE packet;
translating at least one iSCSI command and at least one iSCSI datum from the iSCSI packet into at least one analogous FCoE command and at least one analogous FCoE datum; and
storing the at least one analogous FCoE command and at least one analogous FCoE datum in the FCoE packet.

21. The system of claim 11, further comprising:
the first iSCSI node.

22. The system of claim 21, further comprising:
the FCoE node.

23. The system of claim 11, further comprising:
the FCoE node.

24. A method performed by a gateway, the method comprising:
(A) receiving Internet Small Computer System Interface (iSCSI) packet containing an iSCSI protocol data unit (PDU) from a first iSCSI node using an iSCSI protocol;
(B)

(B)(1) identifying a Fibre Channel over Ethernet (FCoE) node based on contents of the iSCSI packet;

(B)(2) creating an iSCSI ghost node corresponding to the FCoE node, wherein the iSCSI ghost node is a virtual representation of the FCOE node in a physical network; and (B)(3) initiating an iSCSI session between the first iSCSI node and the iSCSI ghost node.

25. The method of claim 24, wherein (B) further comprises:

(B)(4) before (B)(3), creating a session table entry containing communication session mapping information between attributes of the first iSCSI node and attributes of the FCoE node.

26. The method of claim 25, further comprising:

(B)(5) determining whether the iSCSI PDU in the iSCSI packet contains a login command; and (B)(6) performing (B)(1), (B)(2), (B)(3), and (B)(4) in response to determining that the iSCSI PDU in the iSCSI packet contains a login command.

27. The method of claim 24, further comprising:

(C)

(C)(1) storing FCoE data in an FCoE packet based on the mapping information and iSCSI data from the iSCSI packet; and (C)(2) transmitting the FCoE packet to the FCoE node using a FCoE protocol.

28. The method of claim 27, wherein (C) further comprises:

(C)(3) determining whether the iSCSI PDU contains a read command; and (C)(4) performing (C)(1) and (C)(2) in response to determining that the iSCSI PDU contains a read command.

29. The method of claim 27, wherein (C) further comprises:

(C)(3) determining whether the iSCSI PDU contains a write command; and (C)(4) performing (C)(1) and (C)(2) in response to determining that the iSCSI PDU contains a write command.

30. The method of claim 27, wherein (C)(1) comprises converting the iSCSI packet into the FCoE packet.

31. The method of claim 27, wherein (C)(1) comprises:

(C)(1)(a) creating the FCoE packet;

(C)(1)(b) extracting at least one iSCSI command and at least one iSCSI datum from the iSCSI packet into FCoE data;

(C)(1)(c) translating the at least one iSCSI command and at least one iSCSI datum into at least one analogous FCoE command and at least one analogous FCoE datum; and (C)(1)(d) storing the at least one analogous FCoE command and at least one analogous FCoE datum in the FCoE packet.

32. A system comprising:

an Internet Small Computer System Interface (iSCSI) network interface to receive an iSCSI packet containing an iSCSI protocol data unit (PDU) from a first iSCSI node using an iSCSI protocol;

a packet processor to:

identify a Fibre Channel over Ethernet (FCoE) node based on contents of the iSCSI packet;

create an iSCSI ghost node corresponding to the FCoE node, wherein the iSCSI ghost node is a virtual representation of the FCOE node in a physical network; and initiate an iSCSI session between the first iSCSI node and the iSCSI ghost node.

33. The system of claim 32, wherein the packet processor is further to:

create a session table entry containing communication session mapping information between attributes of the first iSCSI node and attributes of the FCoE node.

34. The system of claim 33, wherein the packet processor is further to:

determine whether the iSCSI PDU in the iSCSI packet contains a login command; and to identify the FCoE node, create the iSCSI ghost node, initiate the iSCSI session, and create the session table in response to determining that the iSCSI PDU in the iSCSI packet contains a login command.

35. The system of claim 32, wherein the packet processor is further to store FCoE data in an FCoE packet based on the mapping information and iSCSI data from the iSCSI packet; and wherein the system further comprises an FCoE network interface adapted to transmit the FCoE packet to the FCoE node using a FCoE protocol.

36. The system of claim 35, wherein the packet processor is further to:

determine whether the iSCSI PDU contains a read command; and wherein the packet processor is adapted to store the FCoE data, and the FCoE network interface is adapted to transmit the FCoE packet, in response to determining that the iSCSI PDU contains a read command.

37. The system of claim 35, wherein the packet processor is further to:

determine whether the iSCSI PDU contains a write command; and wherein the packet processor is adapted to store the FCoE data, and the FCoE network interface is adapted to transmit the FCoE packet, in response to determining that the iSCSI PDU contains a write command.

38. The system of claim 35, wherein the packet processor is to store the FCoE data by performing acts including converting the iSCSI packet into the FCoE packet.

39. The system of claim 35, wherein the packet processor is to store the FCoE data by performing acts including:

creating the FCoE packet;

extracting at least one iSCSI command and at least one iSCSI datum from the iSCSI packet into FCoE data;

translating the at least one iSCSI command and at least one iSCSI datum into at least one analogous FCoE command and at least one analogous FCoE datum; and storing the at least one analogous FCoE command and at least one analogous FCoE datum in the FCoE packet.

40. The system of claim 32, further comprising:

the first iSCSI node.

41. The system of claim 40, further comprising:

the FCoE node.

42. The system of claim 32, further comprising:

the FCoE node.

* * * * *